(12) United States Patent
Brown et al.

(10) Patent No.: US 7,733,572 B1
(45) Date of Patent: Jun. 8, 2010

(54) CATADIOPTRIC SYSTEM, APPARATUS, AND METHOD FOR PRODUCING IMAGES ON A UNIVERSAL, HEAD-UP DISPLAY

(75) Inventors: Robert D. Brown, Lake Oswego, OR (US); Kurt A. Stahl, Portland, OR (US); Gerhardt A. Quast, Portland, OR (US); Robert B. Wood, Beaverton, OR (US); Kevin E. Jopes, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 180 days.

(21) Appl. No.: 12/157,234

(22) Filed: Jun. 9, 2008

(51) Int. Cl.
*G02B 27/14* (2006.01)
(52) U.S. Cl. ...................... 359/631; 359/630
(58) Field of Classification Search .......... 359/629–632
See application file for complete search history.

(56) References Cited

U.S. PATENT DOCUMENTS 2,141,884 A   12/1938  Sonnefeld
4,082,432 A   4/1978   Kirschner
4,178,074 A   12/1979  Heller
4,232,943 A   11/1980  Rogers
5,903,395 A * 5/1999   Rallison et al. ............. 359/630

* cited by examiner

*Primary Examiner*—William C Choi
(74) *Attorney, Agent, or Firm*—Matthew J. Evans; Daniel M. Barbieri

(57) ABSTRACT

A present novel and non-trivial system, apparatus, and method for employing a catadioptric optical system in a Head-Up Display ("HUD") system are disclosed. A catadioptric optical module is configured to produce a large image size within a small space envelope by folding the optical path back through module and separating the paths by use of a beam splitter. Such module comprised of a beam splitter, collimating mirror, and correcting lens produces collimated beams of light from an image source providing either polarized or non-polarized beams of light. If polarized beams are provided, the module includes a quarter-wave retarder, and the configuration of the module permits the image source to provide either s-polarized or p-polarized beams. A combiner arm assembly comprising of at least one combiner receives the collimated beams, where the employment of a plurality of combiners extends the relatively small instantaneous field of view.

10 Claims, 14 Drawing Sheets

Example of Prior Art (Overhead Installation)

Example of Prior Art (Glareshield Installation)

CATADIOPTRIC SYSTEM, APPARATUS, AND METHOD FOR PRODUCING IMAGES ON A UNIVERSAL, HEAD-UP DISPLAY

BACKGROUND OF THE INVENTION

1. Field of the Invention

This invention pertains to the field of Head-Up Displays ("HUDs") that provide images in the field of view of a person viewing the scene outside of a vehicle such as an aircraft or automobile.

2. Description of the Related Art

A HUD is typically any transparent display that presents an image without obstructing the viewer's view or requiring the viewer to look away from the scene outside of a vehicle such as an aircraft or automobile while flying or driving. Initially developed for use in military aircraft, HUDs are used in commercial and private aircraft, automobiles, and other applications. HUD systems may be comprised of a plurality of components including, but not limited to, an image projection unit and a partially transparent and reflective optic commonly referred to as a combiner.

In general, a HUD uses a combination of lenses to create a collimated image. Lens designs that achieve the necessary optical performance tend to be complex and expensive, especially when the field of view ("FOV") is high and the diameter of the lens is large. For example, FIG. 1 shows an optical layout of a HUD with a wide FOV, which consists of an image projection unit that employs a relay lens assembly mounted over the viewer's head and a combiner unit located forward of the viewer that may be mounted in an aircraft such as a commercial aircraft. As shown, the relay lens assembly is used to form an intermediate image one focal length away from a transparent combiner, which, in turn, functions as a collimating mirror forming collimated beams of light.

In another example, FIG. 2 shows a HUD assembly comprised of an image projection unit and combiner unit that may be mounted in the glareshield of an aircraft such as a military fighter aircraft. As shown, beams of light leave a group of field flattening lenses, strike a reflecting mirror or prism, and pass through convex and concave lenses to form collimated beams of light.

As shown in the examples of FIGS. 1 and 2, the HUD projection units consist of a complex array of lenses, prisms, and/or mirrors. Examples of other complex arrangements are illustrated in U.S. Pat. Nos. 4,178,074 and 4,232,943. It is not uncommon for these HUDs to contain more than 5 lenses, to have diameters greater than 13 cm (5 in), and to weigh more than 13 kg (28.5 lbs). Generally, the size, weight, and complexity of these optical systems detrimentally affect the costs for an operator to employ them.

Attempts to reduce the cost, size, weight, and complexity have been made by others. For example, a reflective HUD system such as that disclosed in U.S. Pat. No. 4,082,432 which "utilizes a single block of transparent acrylic resin with the upper surface curved and coated to form a collimating mirror. The block itself is comprised of two major portions cemented together with a transparent bonding material wherein the resulting interface forms a combining surface." By its very nature, this block of acrylic is extremely large due to the long eye relief and lack of multiple combiners. Also, a collimating mirror is employed therein, but it is not catadioptric, i.e., does not employ a corrector lens in conjunction with the collimating mirror. If such system were to attempt to employ a corrective lens, such lens would cause a significant distortion of the real world scene because it would have to be placed between viewer and the combining surface of the block. Also, these are large and bulky conventional optics which are heavy and utilize considerable installation space.

Multiple combiners have also been employed. Previous HUD systems may have used multiple combiners to expand the viewer's FOV. In such systems, dual combiners could form two mirror images of a collimating lens, one slightly above and slightly behind the other. Such configuration allows for the use of a smaller collimating lens for the same vertical FOV. In addition, more than two combiners may be used to expand the field. An example of such use is found in U.S. Pat. No. 4,099,841.

BRIEF SUMMARY OF THE INVENTION

The embodiments disclosed herein present novel and non-trivial system, apparatus, and method for employing a catadioptric optical system in a HUD system. One objective of the invention is to provide a compact HUD, i.e., a HUD having a small space envelope and low weight using one or more combiners. A prototype unit of a novel apparatus embodying the disclosures herein measures less than 8,275 cm$^3$ (505 in$^3$) with a combiner arm assembly extended in a viewing position, weighs approximately 4.5 kg (10 lbs), and has a lens diameter less than 9 cm (3.5 in). Besides providing a small space envelope and low weight, another objective is to achieve a HUD design that provides low cost, low power, excellent display accuracy, and achromatization. These objectives may be achieved by employing a novel catadioptric optical module comprising of a beam splitter, collimating mirror, and correcting lens that together produce collimated beams of light. A catadioptric optical module is configured to produce an image by folding the optical path back through the module and separating the paths using a beam splitter, and the use of multiple combiners extends the instantaneous field of view to a usable size. Under such configuration, non-polarized beams of light received by the module may exit the module as collimated beams projected to strike one or more combiners. Under a configuration which includes a quarter-wave retarder and a polarizing beam splitter, polarized beams of light received by the module may exit the module as collimated beams projected to strike one or more combiners. Unlike non-polarized beams of light, polarized beams may provide an increase in efficiency. The embodiments herein apply to systems that employ either polarized or non-polarized beams of light.

In one embodiment, a HUD system is comprised of a module for providing polarized beams from an image source, a catadioptric optical module, and a combiner arm assembly. A catadioptric optical module could be configured for receiving the beams of light and producing collimated beams of light that are projected to a combiner arm assembly comprising one or more combiners, where the use of multiple combiners allows the instantaneous field of view of the viewer to expand. As embodied herein, the module may be configured to receive polarized or non-polarized light. In one embodiment, the module may comprise of a beam splitter, collimating mirror, and correcting lens. In another embodiment, this module may include a quarter-wave retarder and a polarization beam splitter ("PBS") where s-polarized beams could be reflected by the PBS and p-polarized beams could be transmitted by the PBS, and the quarter wave retarder could rotate the polarization state of each beam so as to transmit through or reflect from the PBS on a second pass.

In another embodiment, a HUD apparatus is comprised of a housing assembly containing a catadioptric optical module and attached to a combiner arm assembly. The module could be configured with an interface for receiving non-polarized beams of light, a beam splitter, and a correcting lens. Also, the module could be configured with an interface for receiving polarized beams of light, a polarization beam splitter, a quarter-wave retarder, a collimating mirror, and a correcting lens. A combiner arm assembly could be configured for receiving collimated beams of light comprising one or more combiners, where the use of multiple combiners allows the instantaneous field of view of the viewer to expand. In an additional embodiment, the combiner arm assembly could be pivotally attached to the housing assembly.

In another embodiment, a method for producing an image in a catadioptric HUD system is comprised of receiving beams of light, subjecting the beams to a beam splitter, altering beams subjected to the beam splitter, subjecting the altered beams to the beam splitter, collimating the altered beams subject to the beam splitter, and subjecting the collimated beams to at least one combiner, where the use of multiple combiners may expand the instantaneous field of view. In one embodiment, a collimating mirror alters the beams. In another embodiment, subjecting the beams to a quarter-wave retarder, a collimating mirror, and the quarter-wave retarder again alter the beams.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
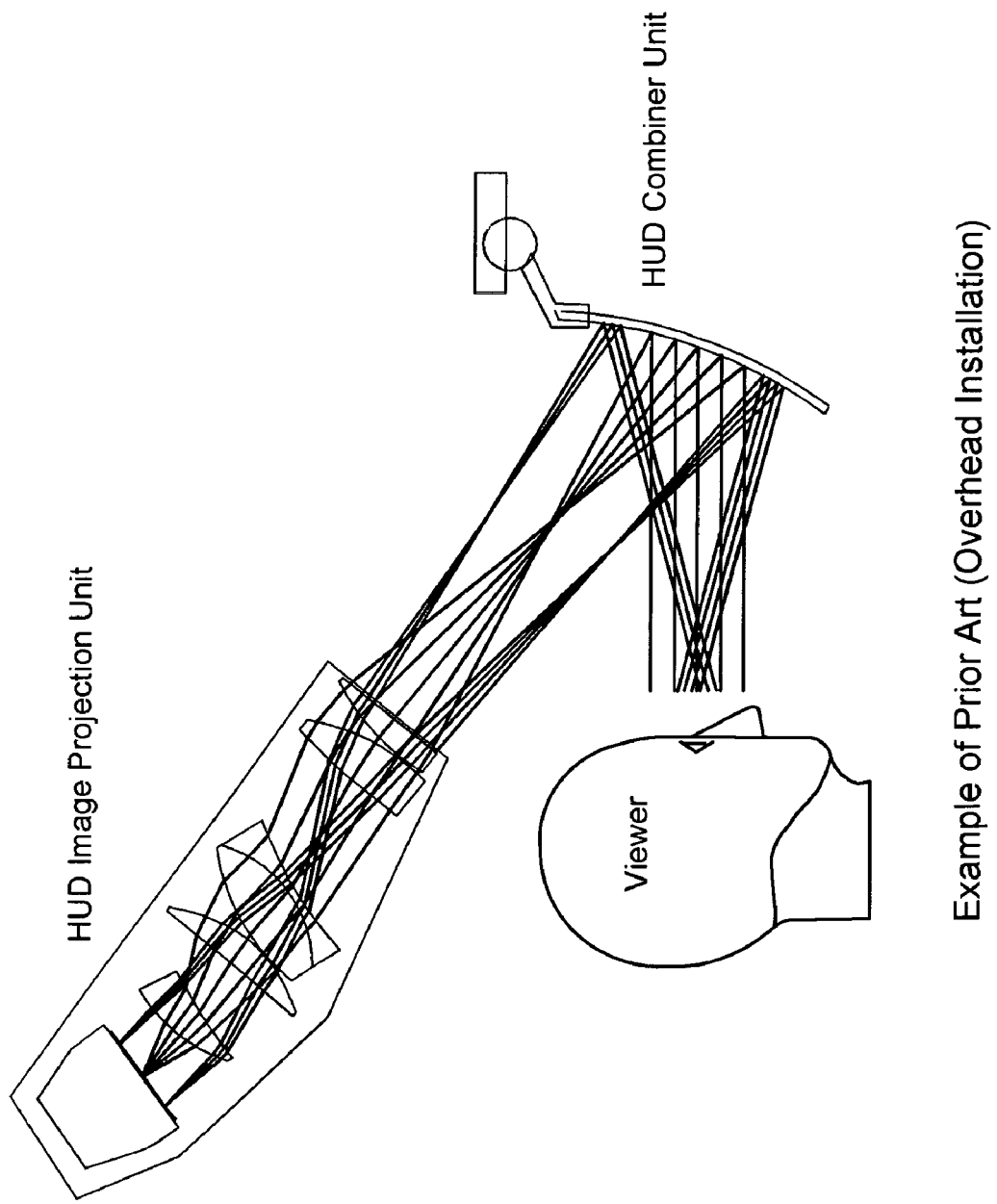
FIG. 1 depicts an example of a typical wide field of view HUD such as found in commercial airliners.
Figure 2:
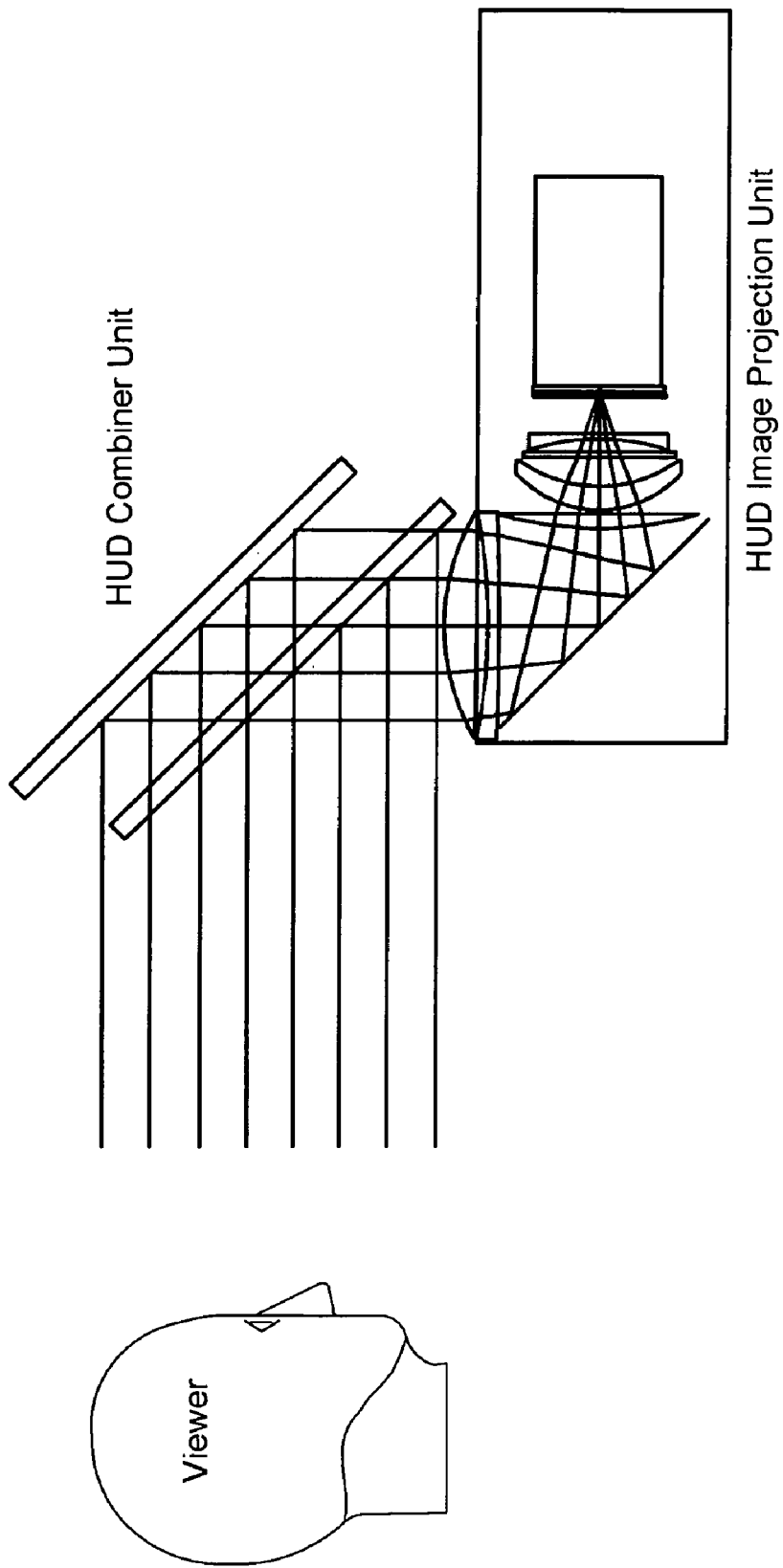
FIG. 2 depicts an example of a typical glareshield mounted HUD such as found in a fighter aircraft.
Figure 3B:
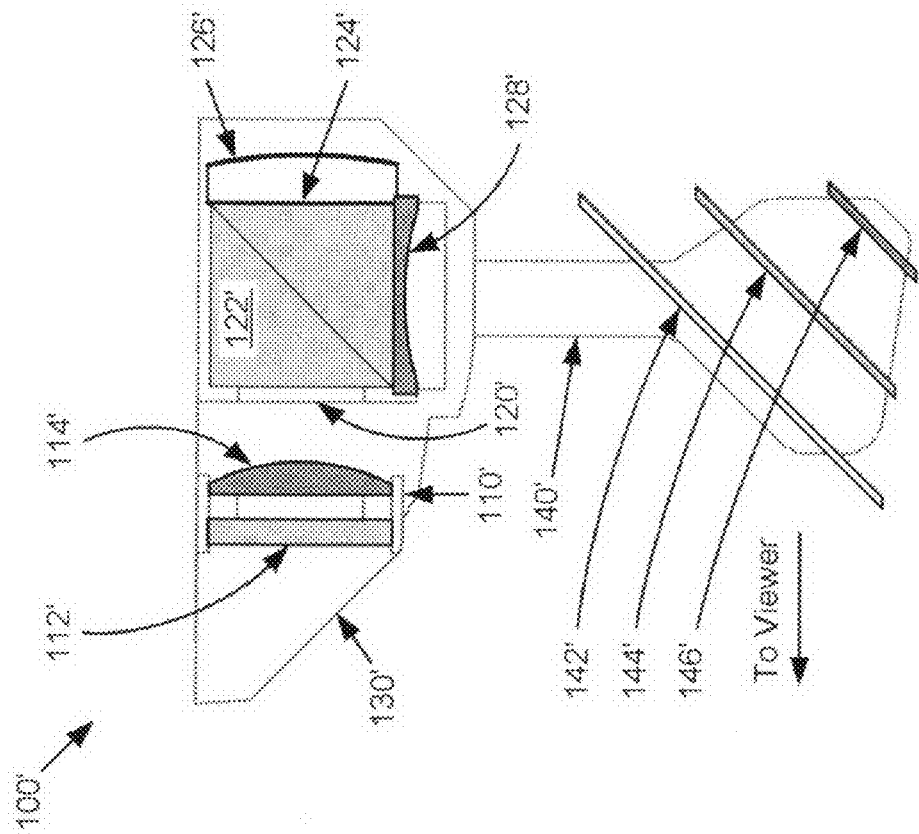
FIGS. 3A and 3B depict examples of catadioptric HUD apparatuses in which the housing assemblies are on the same side of the viewer.
Figure 3A:
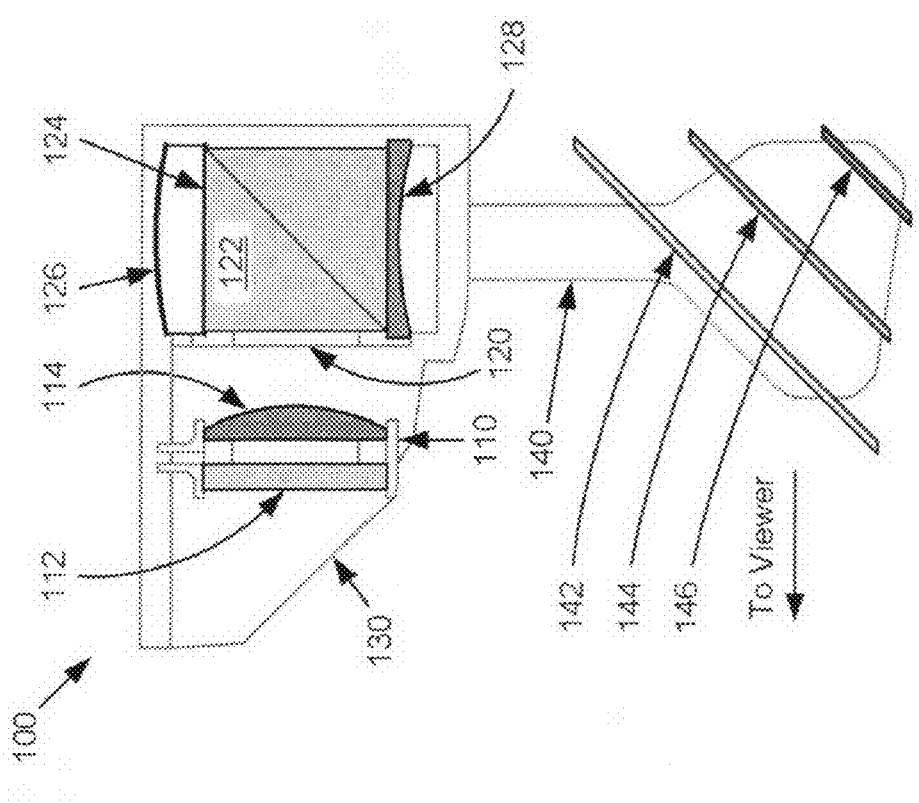

FIGS. 3A and 3B depict catadioptric head-up display ("HUD") apparatuses 100 and 100' suitable for implementation of the techniques described herein. Each respective apparatus may be comprised of an image source module 110 and 110', a catadioptric optical module 120 and 120', and a combiner arm 140 and 140'. For the purposes of discussion herein, the components of catadioptric HUD apparatus 100 as embodied in FIG. 3A may be considered the same as those of catadioptric HUD apparatus 100' as embodied in FIG. 3B although the configurations may differ. For that reason, the components of catadioptric HUD apparatus 100' will not be discussed separately; however, where the configurations differ between the two, a separate discussion will be provided. It should be noted that the drawings of FIG. 3 may not be drawn to scale.

Generally, a catadioptric optical system is a system that uses both reflective and refractive optic principles to form an image rather than one or the other. That is, catadioptric optical system employs both a mirror and lens. A catadioptric system is generally much shorter, saving weight and bulk. Although the installation in an aircraft is one use for which a HUD may be employed, the embodiments herein should not be considered as limited to the field of aviation. As embodied herein, the embodiments disclosed herein may apply to any field in which a person may be monitor or view the scene outside of the vehicle but needs to monitor or view information normally requiring the viewer to take his or her vision away from the scene outside of the vehicle. Examples of situations where the viewer may act in such a manner include, but not limited to, the fields of aviation and automobiles. Because of its compact size, the disclosures herein may provide a suitable and low cost aid for the pilot of an aircraft or a driver of an automobile.

As embodied in FIG. 3A, an image source module 110 could comprise an image source 112 and a field flattening lens 114. As embodied herein, an image source 112 could be any device for providing an image adaptable to a HUD system. An image source 112 could receive image data from any one of a plurality of image data sources. For instance, in the field of aviation instrumentation, image data could be data representative of the same information found on a primary flight display, such as "basic T" information (i.e., airspeed, attitude, altitude, and heading), and a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications; additionally, such image data could be provided to an image source 112 by a either a synthetic vision system, enhanced vision system, or both, wherein such image data includes data representative of terrain. In the field of automobile instrumentation, examples of image data sources that could provide information or a plurality of indications in an automobile include, but are not limited to, data representative of location, speed, coolant temperature, oil pressure, fuel level, and any information that a driver may consider useful or helpful.

The image emitted from the image source 112 could ultimately be provided to a viewer of the combiner arm 140 after being subjected to a catadioptric optical module 120. Examples of image sources include, but are not limited to, a digital image source, a CRT-based image source, an LCD-based, a compact LCD, an organic LED, a plasma display, a laser source, or an image source formed through a combination of image sources. It should be noted that if an image source does not emit polarized beams of light, a polarizer (not shown) may be included in the image source module 110.

As embodied herein, a field flattening lens 114 could be any optical device that refracts and transmits beams of light representative of the image. A field flattening lens 114 may be employed to compensate for the curvature of the field inherently generated by a catadioptric optical system. In one embodiment, a field flattening lens 114 could be employed where a catadioptric optical module 120 could emit an inadequately-collimated image. An image that is not adequately conformal with the background scene could ultimately be displayed on a single combiner or double images could be displayed on multiple combiners. In another embodiment, a field flattening lens 114 may not need to be employed if an image source 112 such as a suitably-curved CRT could compensate for the curvature of the field inherently generated by a catadioptric optical system.

As embodied in FIG. 3, a catadioptric optical module 120 could comprise of a beam splitter 122, a quarter-wave retarder 124, a collimating mirror 126, and a correcting lens 128.

As embodied herein, a beam splitter 122 could be any optical instrument in which beams of light may be split. A beam splitter 122 could comprise two triangular glass prisms; however, any suitable material may be used which could provide the transmission and reflection requirements as discussed herein. One of the two glass prisms could have a partially reflecting coating on its hypotenuse surface such that half of the light incident through a port is reflected and the other half is transmitted. For polarizing beam splitters, the coating could reflect light with one state of polarization (e.g., s-polarization) and could transmit light with another state of polarization (e.g., p-polarization). As embodied herein, the design of the beam splitter could comprise a mirror of which a plate of glass could be coated with a thin film of aluminum where the thickness of the aluminum may be determined to achieve the desired optical result. Alternatively, a dielectric coating or a very thin pellicle film may be used.

In an embodiment of FIG. 3A, a beam splitter 122 may reflect s-polarized beams of light provided from an image source module 110, causing them to be directed towards a quarter-wave retarder 124. Then, after the beams of light are subjected to a quarter-wave retarder 124, a collimating mirror 126, and the quarter-wave retarder 124 again, the beam splitter 122 may transmit the newly-formed p-polarized beams of light to a correcting lens 128. In an embodiment of FIG. 3B, a beam splitter 122' may transmit p-polarized beams of light provided from an image source module 110' through the beam splitter 122'. Then, after the beams of light are subjected to a quarter-wave retarder 124', a collimating mirror 126', and the quarter-wave retarder 124' again, the beam splitter 122' may reflect the newly-formed s-polarized beams of light, causing them to be directed towards a correcting lens 128'.

It should be noted that a beam splitter does not have to be a polarizing beam splitter. A non-polarizing beam splitter of, for example, approximately 50% reflection and approximately 50% transmittance may be used. While a polarizing beam splitter may enable high efficiency operation relative to a non-polarizing beam splitter, the added costs associated with, for example, of coatings and a quarter-wave retarder 124 may not be warranted in all applications. Although the discussions herein will focus with the applications of polarized light, the embodiments herein are not limited to polarized light applications and should not be construed as such.

As embodied herein, a quarter-wave retarder 124 could be any optical device which may alter or change the polarization of a beam of light travelling through it In one embodiment, the quarter-wave retarder 124 could be comprised of a birefringent film of carefully chosen thickness to produce the desired retardation at the wavelengths of interest. In another embodiment, a quarter-wave retarder could comprise of a birefringent crystal with a carefully chosen thickness.

Subjecting beams of light travelling to a quarter-wave retarder 124 twice could result with a re-polarization of the beams. In an embodiment of FIG. 3A, s-polarized beams of light leaving a beam splitter 122 could become p-polarized beams of light after a second pass through a quarter-wave retarder 124; in an embodiment of FIG. 3B, p-polarized beams of light leaving a beam splitter 122' could become s-polarized beams of light after a second pass through a quarter-wave retarder 124'.

As embodied herein, a collimating mirror 126 could be a mirror or any reflective optical device which produces nearly substantially collimated (i.e., nearly parallel) rays of light from a point source on the display, resulting in a virtual image of the display source such that the virtual image is located at or near optical infinity.

A correcting lens 128 could be any optical device that may refract and transmit beams of light. A correcting lens 128 may reduce the residual aberrations inherent in the collimating device (such as spherical aberration, coma, astigmatism and other classical aberrations.) As embodied herein, substantially collimated beams may be brought into full collimation by a correcting lens. Once the beams of light have become collimated, they may be reflected by a combiner module 130.

As embodied in FIGS. 3A and 3B, each housing assembly 130 and 130' may be used to mount an image source module 110 and 110' and a catadioptric optical module 120 and 120', respectively, to form one unit. By comparing assemblies 130 and 130', it can be seen that the shape of each may take a different form due to the configuration, placement, or arrangement of the components that comprise the modules. This illustrates an advantageous feature of the embodiments disclosed herein, for it could provide flexibility in the installation of a catadioptric HUD apparatus to a vehicle. For example, an installer may have the choice between a narrow profile housing assembly 130 embodied in FIG. 3A or a flat profile housing assembly 130' embodied in FIG. 3B.

As embodied in FIG. 3A, a combiner arm 140 may be employed to mount one or more combiners into a suitable position so that collimated beams of light may be reflected towards the viewer, thereby presenting to the viewer an image represented by the beams of light. A combiner could be a display device used in an optical system. A combiner could comprise a transparent, semi-reflective surface where such surface permits the viewer to view the outside real-world scene while simultaneously viewing information contained in an image reflected toward the viewer by one or more combiners. As embodied herein, a combiner arm 140 could comprise of one or a plurality of combiners; as embodied in FIG. 3A, a combiner arm 140 may be comprised of an upper combiner 142, a middle combiner 144, and a lower combiner 146. As will be discussed below, the use of more than one combiner may be advantageous by expanding the display's instantaneous field of view ("FOV").

Figure 3C:
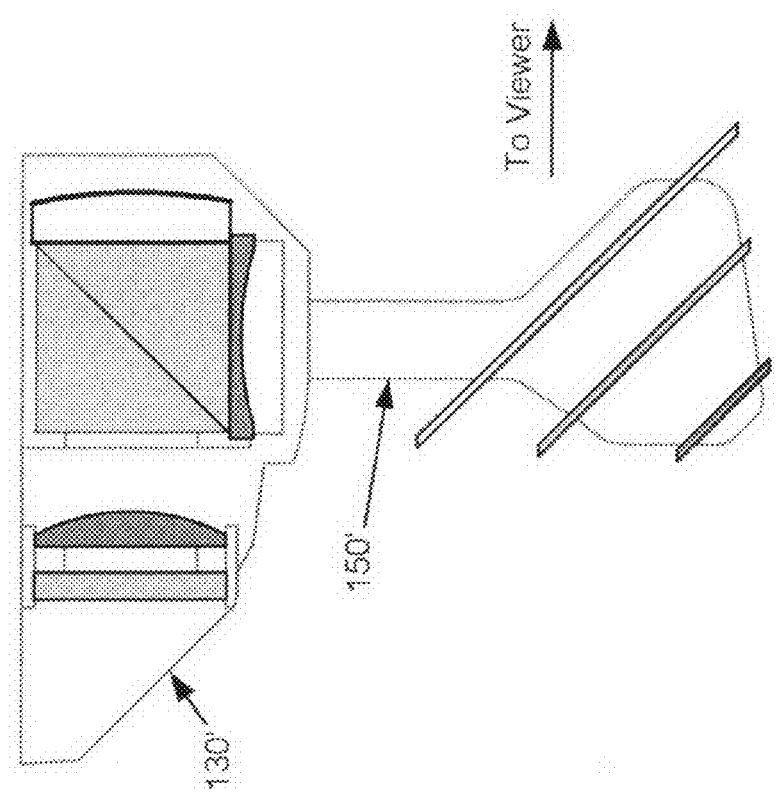
FIGS. 3C and 3D depict examples of catadioptric HUD apparatuses in which the housing assemblies are on the opposite side of the viewer.
Figure 3D:
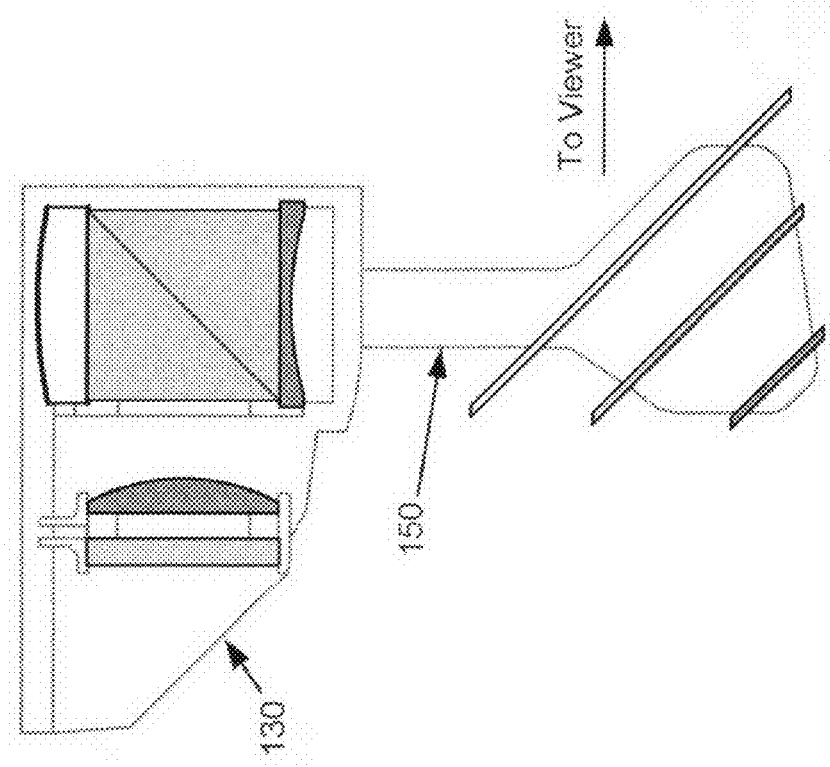

Another advantage of the embodiments disclosed herein is, given the same position of a housing assembly, the ability to select the direction in which the collimated beams of light are directed to the viewer by repositioning the combiner arm. In the embodiments of FIGS. 3A and 3B, a viewer is positioned to the left of combiner arms 150 and 150', and the housing assemblies 130 and 130' are one the same side as the viewer. In the embodiments of FIGS. 3C and 3D, a viewer is positioned to the right of the combiner arms 150 and 150', and the housing assemblies 130 and 130' are on the opposite side of the viewer.

Figure 4B:
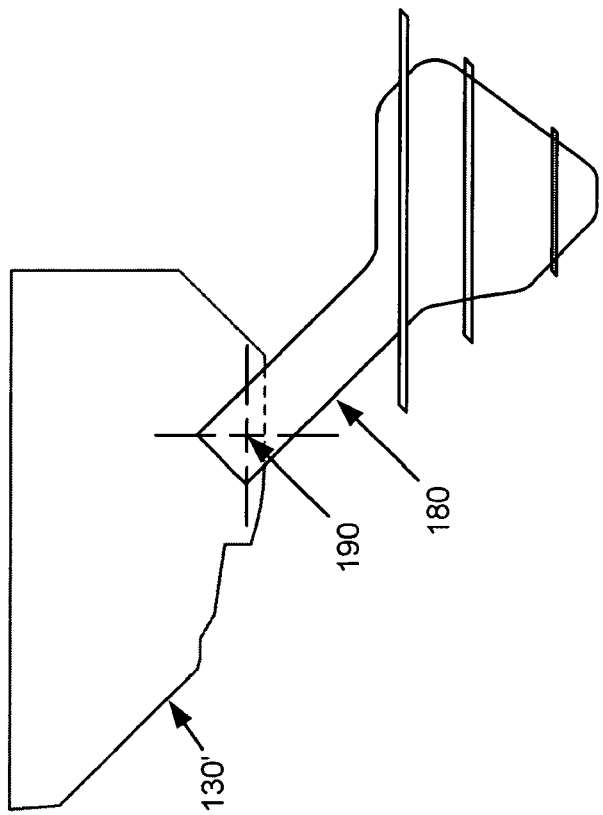
FIGS. 4A and 4B depict examples of pivoting combiner arm assemblies.
Figure 4B:
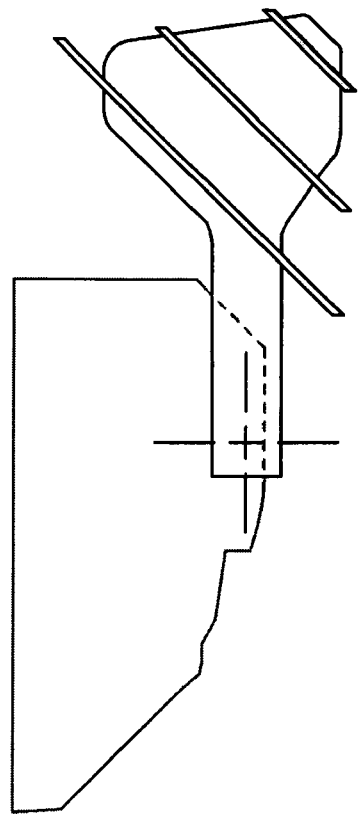
Figure 4A:
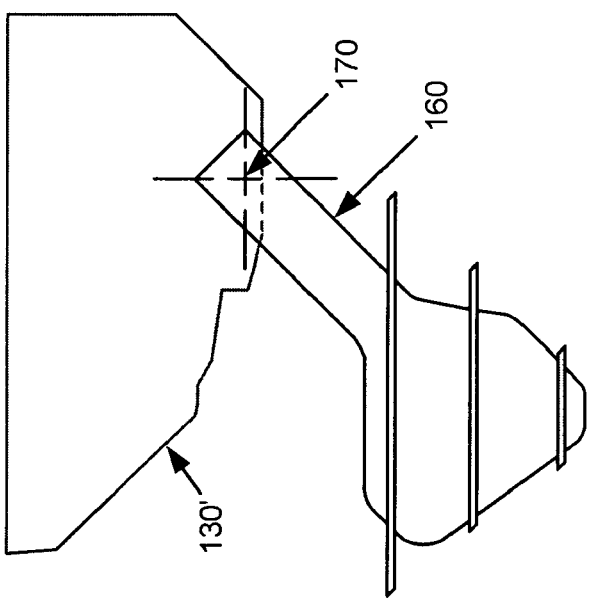
Figure 4A:
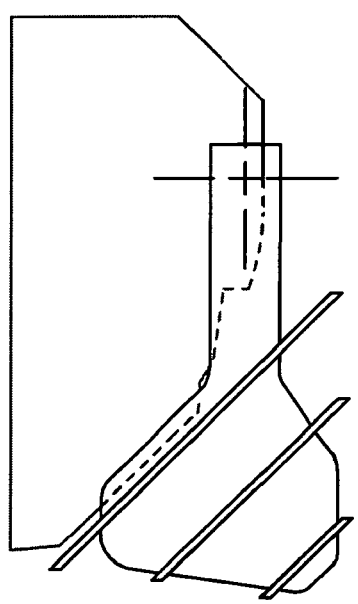

Another advantage of the embodiments disclosed herein is, given the same position of a housing assembly, the ability to stow or pivot a combiner arm assembly. For the purpose of illustration and not for limitation, housing assembly 130' is depicted in the drawings of FIG. 4 although the embodiments disclosed herein are not limited to only housing assembly 130'. In the embodiments of FIG. 4A, a combiner arm assembly 160 (representative, for example, of housing assemblies 140 and 140') could be attached to housing assembly 130' so that it may rotate about pivot point 170. Additionally, the combiner arm assembly 160 could be pivotally attached in a manner to allow it to be stowed as shown in the lower drawing of FIG. 4A. In the embodiments of FIG. 4B, a combiner arm assembly 180 (representative, for example, of housing assemblies 150 and 150') could be attached to housing assembly 130' so that it may rotate about pivot point 190. Additionally, the combiner arm assembly 180 could be pivotally attached in a manner to allow it to be stowed as shown in the lower drawing of FIG. 4B. The ability to stow and the direction of pivoting and stowage are obvious advantages because it allows the viewer an option of using or not using a catadioptric HUD apparatus, and if the user chooses to use such apparatus, then he or she may deploy the combiner arm assembly 160.

Figure 5A:
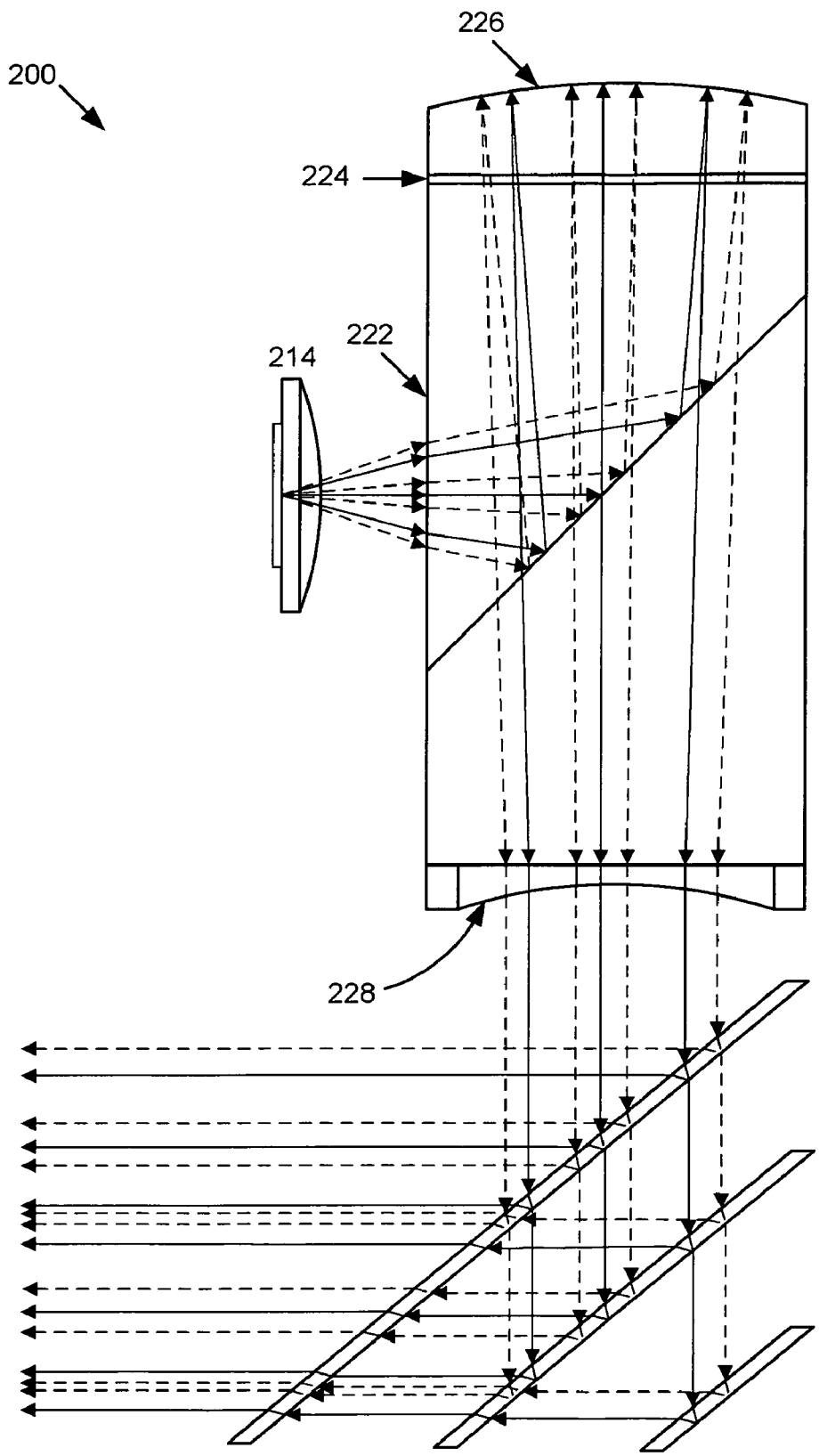
FIGS. 5A and 5B depict optical schematics of catadioptric HUD systems tracing the beams associated with one point of light.
Figure 5B:
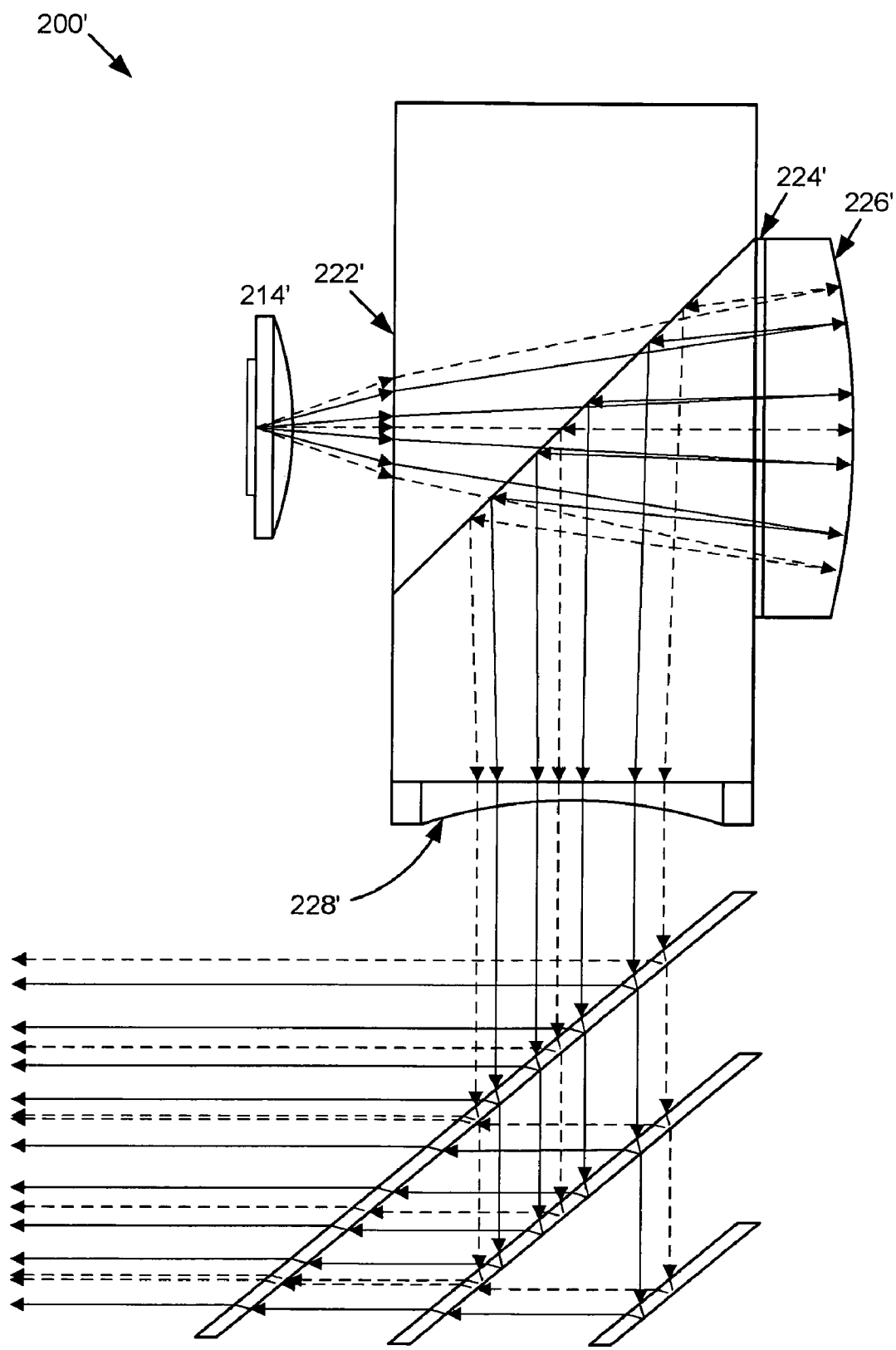
Figure 6A:
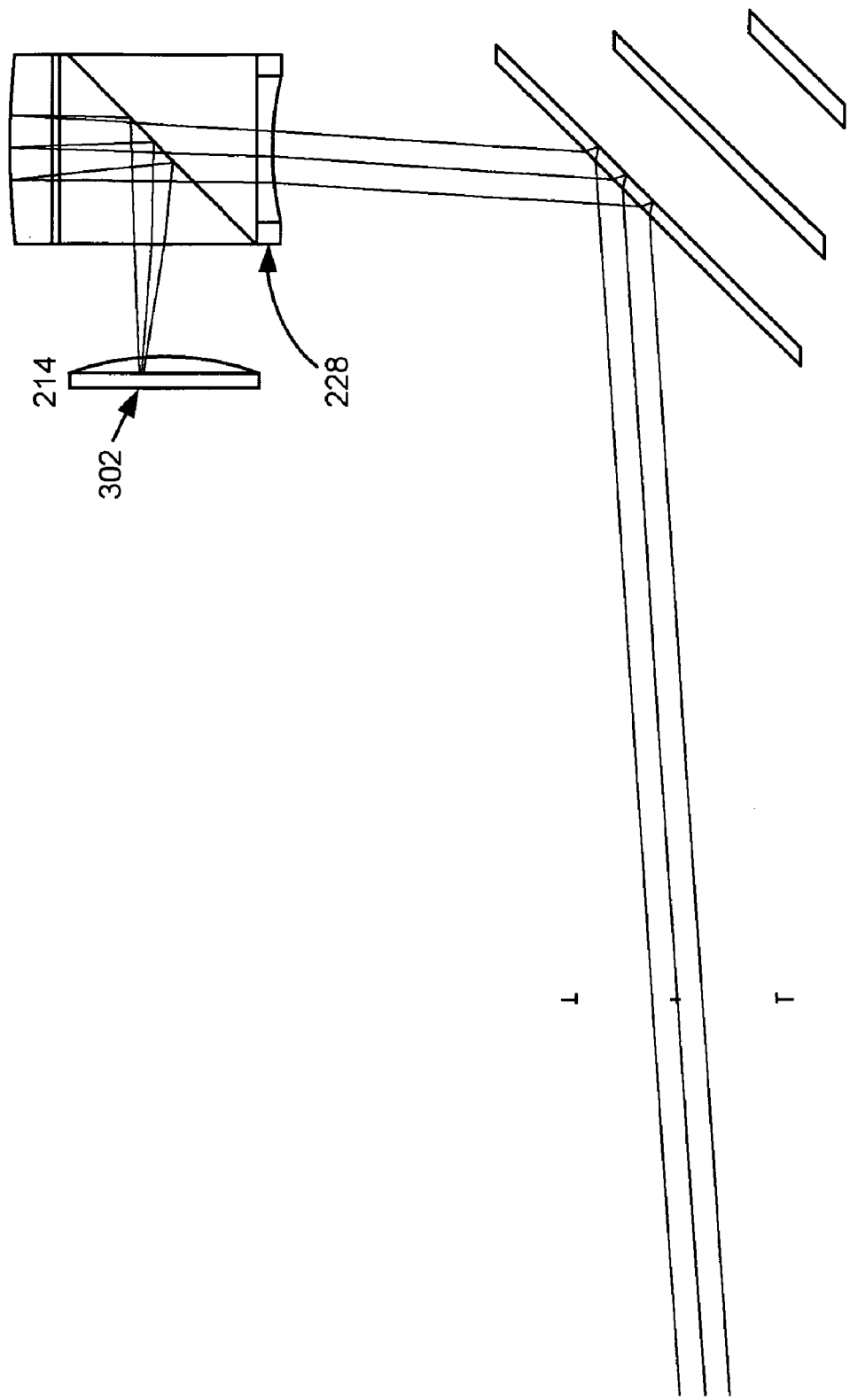
FIGS. 6A through 6E depict optical schematics of catadioptric HUD systems tracing the beams associated with plurality points of light.
Figure 6B:
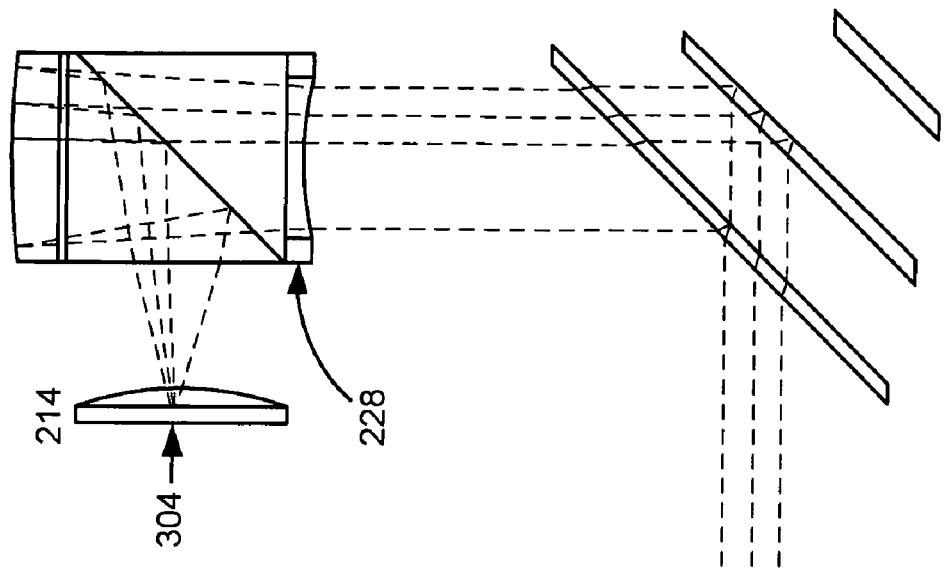
Figure 6C:
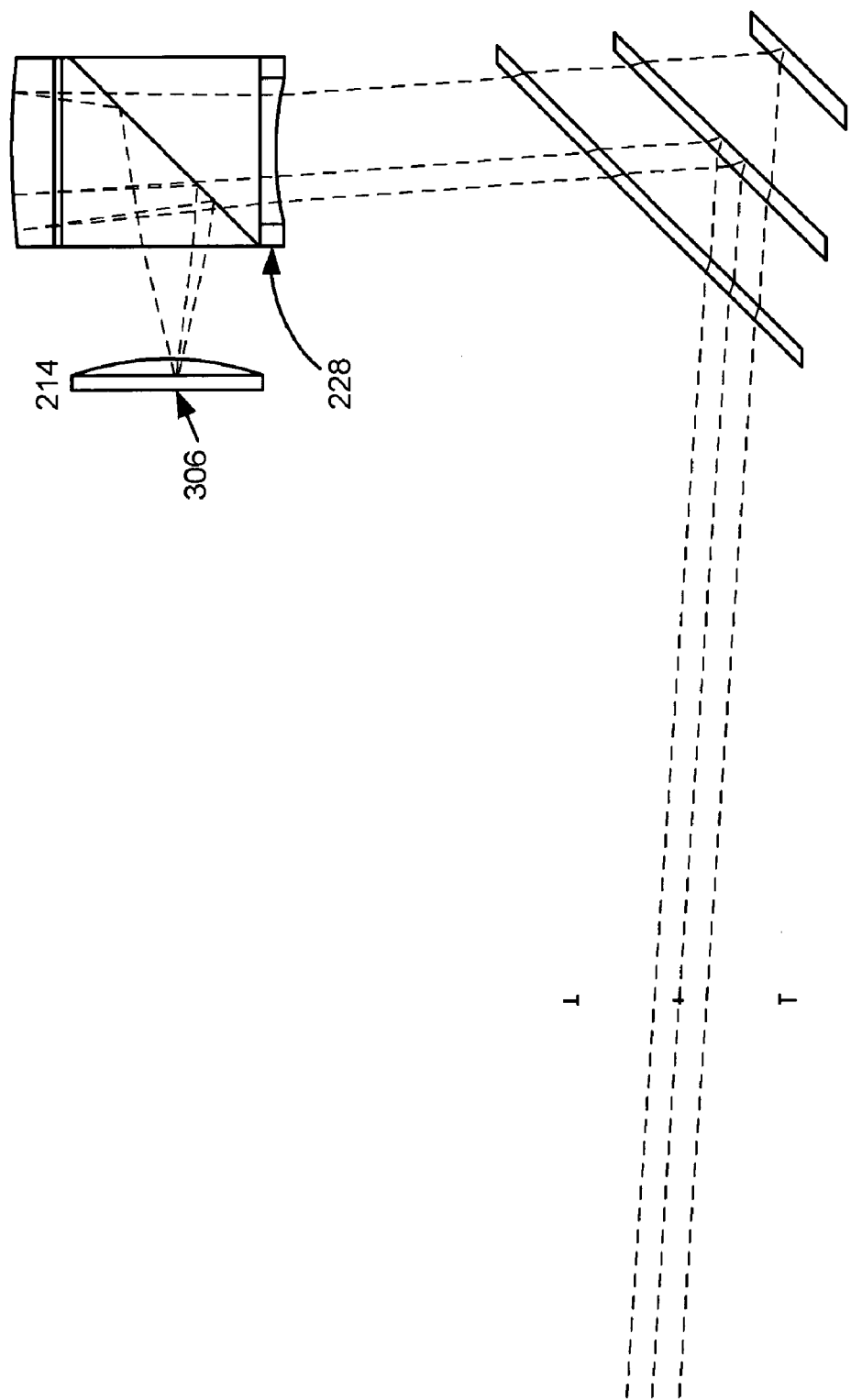
Figure 6D:
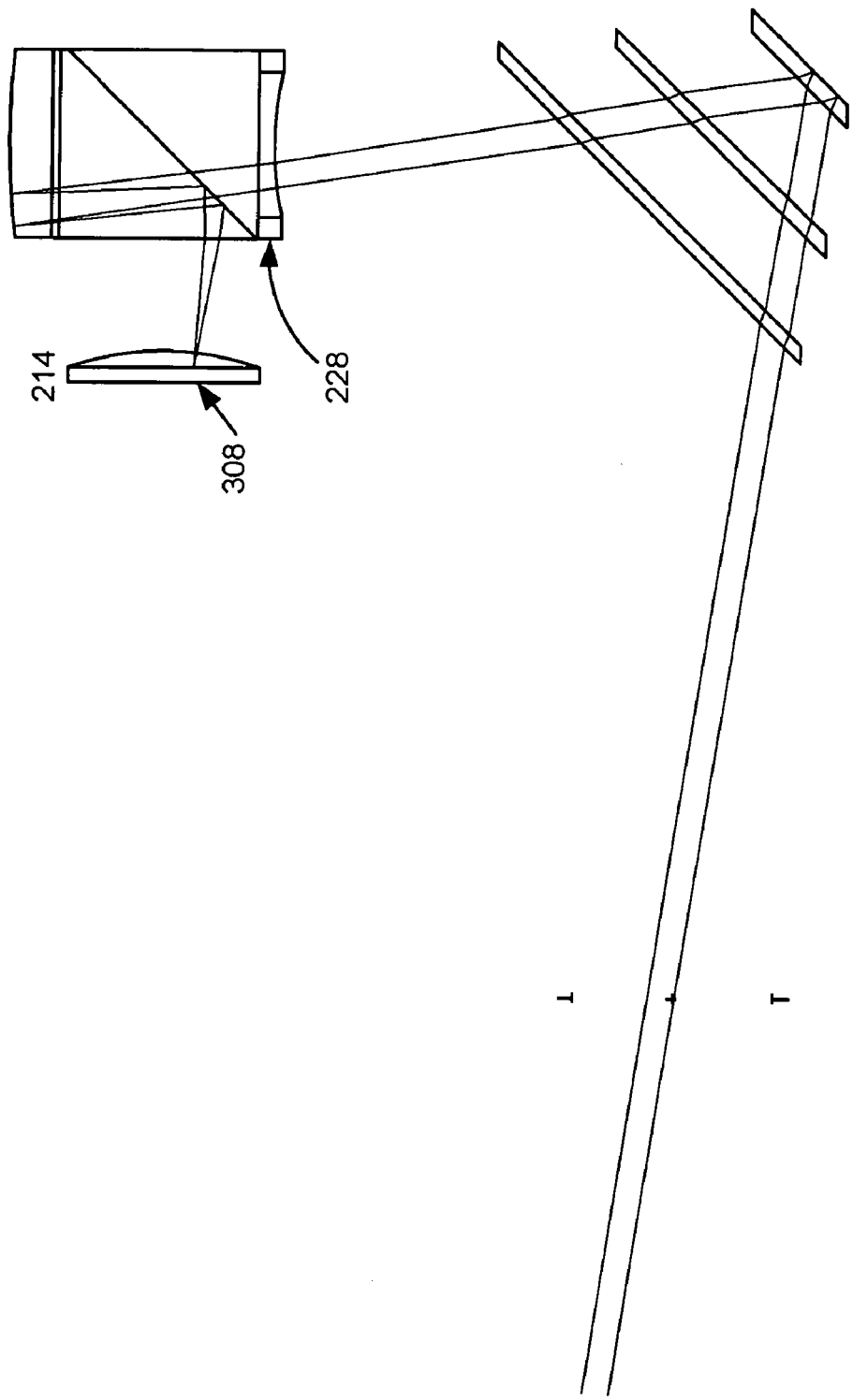
Figure 6E:
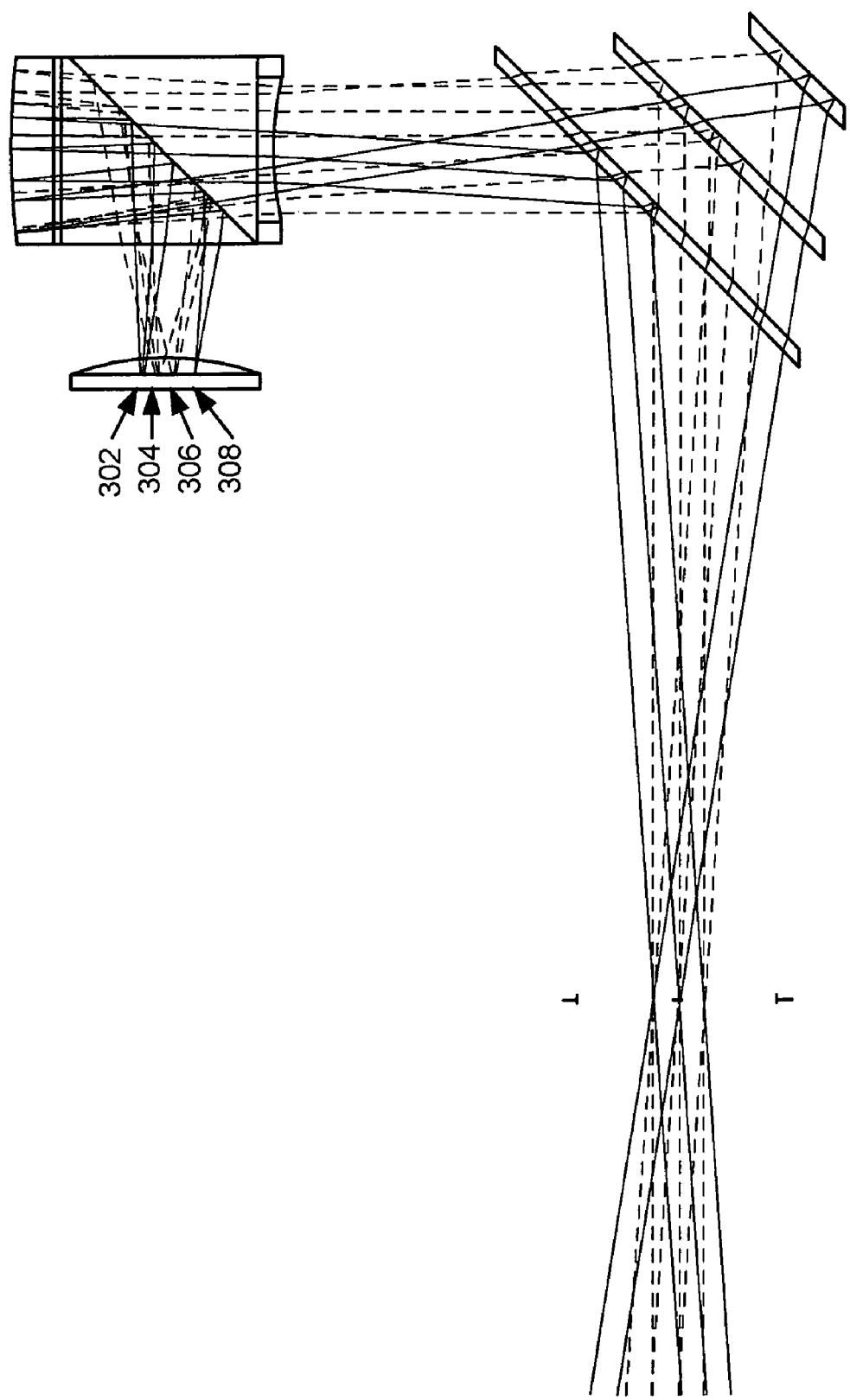

Another advantage of the embodiments disclosed herein is the flexibility of which to mount housing assemblies. In the embodiments of the drawings of FIGS. 3 and 4, housing assemblies 130 and 130' have been mounted above the viewer (e.g., the pilot of an aircraft or the driver of an automobile); in those embodiments in which a pivoting combiner arm assembly may be stowed, the deployment of such assembly may require the viewer to lower assembly. These embodiments, however, have been provided for the purpose of illustration and not of limitation. As embodied herein, housing assemblies may be mounted below the viewer (e.g., the instrument panel in front of a pilot or the dashboard of an automobile); in those embodiments in which a pivoting combiner arm assembly may be stowed, the deployment of such assembly may require the viewer to raise the assembly. FIGS. 5A and 5B depict optical schematics illustrating the optical paths of one point of light of catadioptric HUD systems 200 and 200' suitable for implementation of the techniques described herein. It should be noted that the catadioptric HUD system 200 embodied in FIG. 5A could be employed in the catadioptric HUD apparatus 100, and the catadioptric HUD system 200' embodied in FIG. 5B could be employed in the catadioptric HUD apparatus 100'. For the purposes of discussion herein, the components of catadioptric HUD system 200 as embodied in FIG. 5A may be considered the same as those of catadioptric HUD system 200' as embodied in FIG. 5B although the configurations may differ. For that reason, the components of catadioptric HUD system 200' will not be discussed separately; however, where the configurations differ between the two, a separate discussion will be provided.

As embodied herein, a point of light emitted from an image source passes through a field flattening lens 214 and presented at the surface of a beam splitter 222 (for the ease of understanding, the numbering scheme used for the drawings of FIG. 5 will be similar to that used for the components of the drawings of FIG. 3). It should be noted that if an image source does not emit polarized beams of light but polarized beams are desired, a polarizer (not shown) may be included in the system prior to providing beams of light to beam splitter 222. In an embodiment of FIG. 5A, s-polarized beams of a point of light could be provided to beam splitter 222. In an embodiment of 3B, p-polarized beams of a point of light could be provided to beam splitter 222'.

In an embodiment of FIG. 5A, a beam splitter 222 may reflect s-polarized beams, causing them to be directed towards a quarter-wave retarder 224. Then, after the beams are subjected to a quarter-wave retarder 224, reflected by a collimating mirror 226, and subjected to the quarter-wave retarder 224 again, the beam splitter 222 may transmit the newly-formed p-polarized beams of a point of light to a correcting lens 228. Upon exiting corrector lens 228, the beams may be collimated.

In an embodiment of FIG. 5B, a beam splitter 222' may transmit p-polarized beams provided through the beam splitter 222'. Then, after the beams are subjected to a quarter-wave retarder 224', reflected by a collimating mirror 226', and subjected to the quarter-wave retarder 224' again, the beam splitter 222' may reflect the newly-formed s-polarized beams of a point of light, causing them to be directed towards a correcting lens 228'. Upon exiting corrector lens 228', the beams may be collimated.

As embodied in the drawings of FIG. 5, the collimated beams of a point of light are subjected to a plurality of combiners of a combiner arm. Each collimated beam striking the upper combiner is split, part of the beam being reflected in parallel towards the viewer to the left, and part of the collimated beam is transmitted in the direction of a middle combiner. Similarly, each beam striking the middle combiner is split, part of the beam reflected in parallel towards the viewer to the left via transmission through the upper combiner, and part of the collimated beam is transmitted in the direction of a lower combiner. Similarly, each beam striking the lower combiner is split, part of the beam reflected in parallel towards the viewer to the left via transmission through the middle and upper combiners. As embodied herein, the preceding discussion could apply equally where the combiner arms are configured to face in the opposite direction as shown in FIGS. 3C and 3D, and viewer is located to the right of them.

It should be noted that, although the embodiments of FIGS. 5A and 5B have discussed polarized beams, the embodiments disclosed herein also encompass non-polarized beams. As discussed above, a polarizing beam splitter may enable high efficiency operation relative to a non-polarizing beam splitter, but the added costs associated with, for example, of coatings and a quarter-wave retarder 124 may not be warranted in all applications. A non-polarizing beam splitter of, for example, approximately 50% reflection and approximately 50% transmittance may be used. That is, beams may be reflected and transmitted. In such cases, one or two collimating mirrors may be used, where two could increase the efficiency of the system. For example, one collimating mirror may be positioned similarly as the collimating mirror 126 shown in FIG. 3A to reflect those non-polarized beams reflected by a beam splitter and taking an optical path similar to the path shown in FIG. 5A. A second collimating mirror may be positioned similarly as the collimating mirror 126' shown in FIG. 3B to reflect those non-polarized beams transmitted through a beam splitter and taking an optical path similar to that shown in FIG. 5B.

The drawings of FIG. 6 depict optical schematics illustrating the optical paths of more than one point of light of catadioptric HUD system 200 suitable for implementation of the techniques described herein. As shown in FIGS. 6A through 6D, each respective point of light 302, 304, 306, and 308 that enters a catadioptric optical module exits as collimated by a correcting lens 228.

Figure 7:
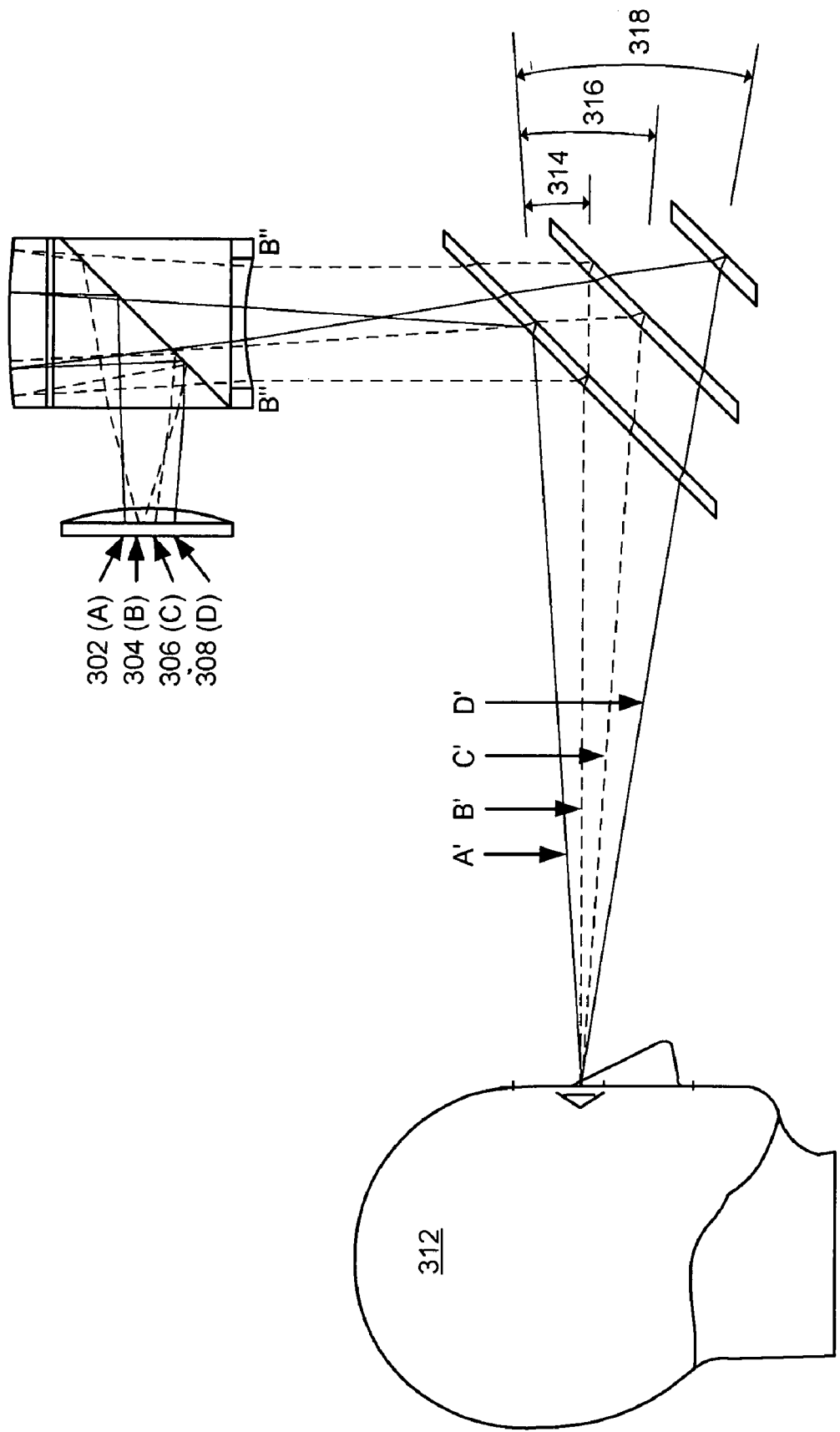
FIG. 7 depicts an optical schematic of a catadioptric HUD system tracing the beams associated with plurality points of light.

FIG. 7 depicts additional advantages of an optical schematic of a catadioptric HUD system 200 depicted in the drawings of FIG. 6. As shown in FIG. 7, points of light 302, 304, 306, and 308 are depicted again but without the multitude of the beams shown in the drawings of FIG. 6E. Instead, the quantity of beams have been intentionally made minimal for the sake of presentation and to illustrate how the beams of light labeled as A, B, C, and D emitted from points 302, 304, 306, and 308, respectively, are viewable by a viewer 312.

After being subjected to a catadioptric system disclosed in FIG. 5A, beams of light A', B', C', and D' are presented for viewing by viewer 312.

Additional advantages and benefits of the embodiments disclosed herein are depicted in FIG. 7. First, the instantaneous FOV may be expanded through the use of multiple combiners; in other words, the use of multiple combiners could enable the use of a relatively small optical aperture for which the instantaneous FOV would be too small for use with a single combiner. As indicated by FIG. 7, the upper combiner could produce an FOV 314. With the addition of the middle combiner, the combination of two combiners could produce an FOV 316. With the addition of the lower combiner, the combination of three combiners could produce an FOV 318.

Second, an overlap of beams reflected off a plurality of combiners could exist. As shown in FIG. 7, there is an overlap of the left-hand and right-hand beams B" to produce B'. Two collimated beams B" strike the upper combiner. Left-hand beam B" is reflected towards the viewer for viewing, and right-hand B" is transmitted in the direction of a middle combiner. Then, right-hand B" strikes the middle combiner and part of the beam is reflected towards the viewer via transmission through the upper combiner. As shown, B' is comprised of an overlap of the reflected left-hand beam B" and the reflected right-hand beam.

Figure 8:
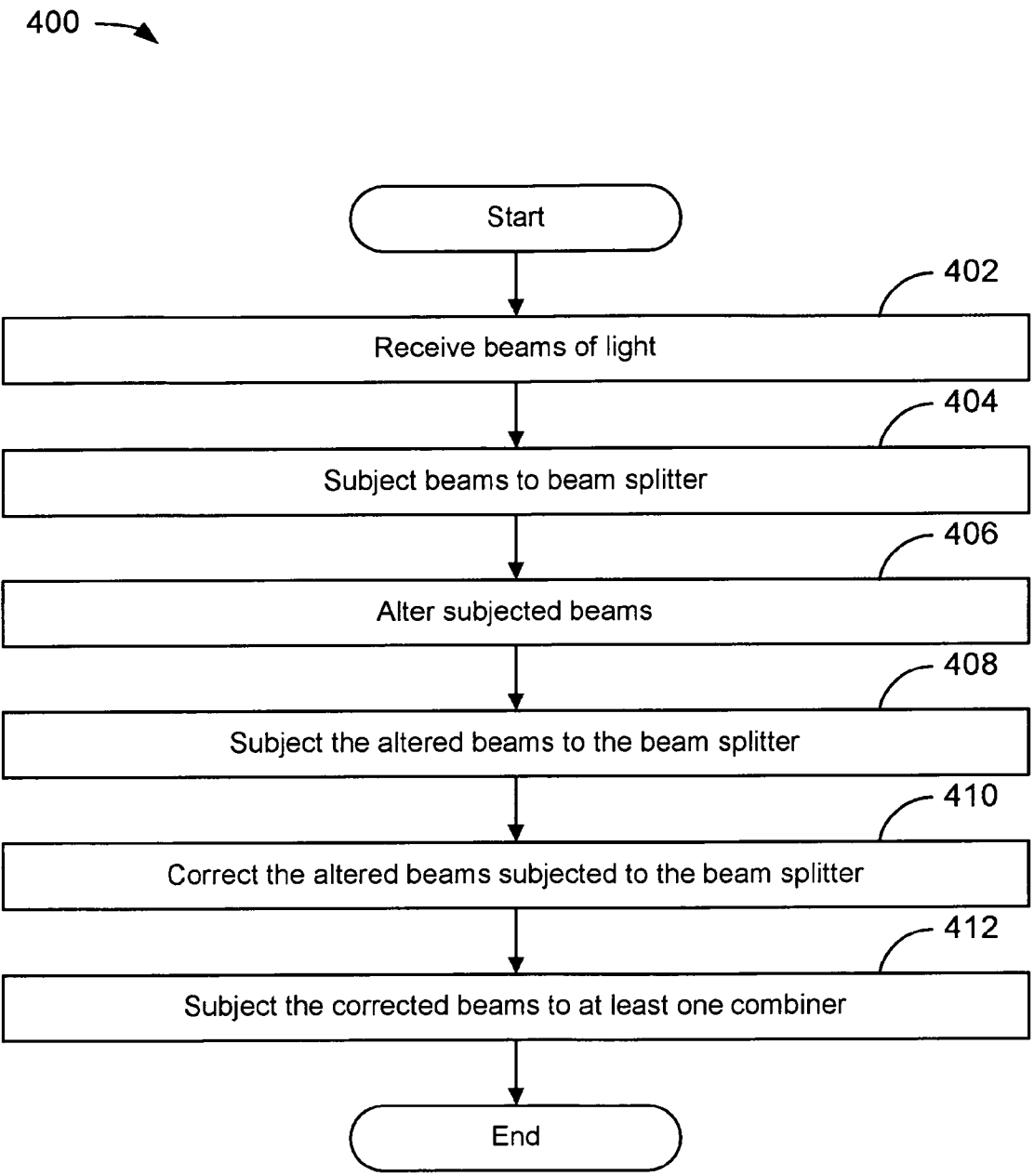
FIG. 8 provides a flowchart illustrating a method for producing an image in a catadioptric HUD system.

FIG. 8 depicts a flowchart 400 of an example of a producing a collimated image in a catadioptric optical system 200 and 200'. The flowchart begins with module 402 with receiving of beams of light from an image source through a port of a catadioptric optical module. The receipt of such beams could be accomplished by providing the beams to a surface of a beam splitter. In one embodiment, the beams of light could be s-polarized beams of light that could form the image reflected by one or more combiners after passing through a catadioptric optical module 120. In another embodiment, the beams of light could be p-polarized beams of light that could form the image reflected by one or more combiners after passing through a catadioptric optical module 120'. In another embodiment, the beams of light could be non-polarized beams of light that form the image reflected by one or more combiners after passing through a catadioptric optical module.

The flowchart continues with module 404 with the subjecting the beams of light to a beam splitter. In one embodiment, subjecting s-polarized beams the beams of light could result with the beams of light being reflected by a polarizing beam splitter. In another embodiment, subjecting p-polarized beams the beams of light could result with the beams of light being transmitted through a polarizing beam splitter 222. In another embodiment, subjecting p-polarized beams the beams of light could result with the beams of light being transmitted through a polarizing beam splitter 222'. In another embodiment, subjecting non-polarized beams of light could result with the beams of light being reflected and transmitted through a beam splitter.

The flowchart continues with module 406 with the altering of beams of light that have been subjected to the beam splitter by subjecting the beams to a collimating mirror and producing substantially-collimated beams. In one embodiment, the altering of the beams could include passing polarized beams through a quarter-wave retarder before and after being substantially-collimated by the mirror. As a result of the two passes through the retarder, the polarization of the beams of light could be altered. In one embodiment, s-polarized beams subjected to two passes through a quarter-wave retarder 224 may result in p-polarized beams the beams of light. In another embodiment, p-polarized beams subjected to two passes through a quarter-wave retarder 224' may result in s-polarized beams the beams of light. In another embodiment, the altering of the beams could include subjecting non-polarized beams of light to two collimating mirrors to increase the efficiency.

The flowchart continues with module 408 with the passing of the altered beams to the beam splitter again but in a different direction. In one embodiment, subjecting the beams altered to p-polarized beams of light could result with the beams of light being transmitted through a beam splitter 222. In another embodiment, subjecting the beams altered to s-polarized beams of light could result with the beams of light being reflected by a beam splitter 222'. In another embodiment, subjecting the altered, non-polarized beams could result with the beams of light being reflected and transmitted by a beam splitter.

The flowchart continues with module 410 with the correcting of the altered beams subjected to the beam splitter with a corrector lens, which may cause the substantially-collimated beams to become collimated. The flowchart continues with module 412 with the corrected beams being subjected to at least one combiner of the combiner arm assembly, thereby resulting with an image being displayed. As embodied herein, a combiner arm comprising of two or more combiners could increase to a viewer's instantaneous field of view. Then, the flowchart proceeds to the end.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A head-up display system, such system comprising:
an image source module;
a catadioptric optical module, wherein such module is configured to
receive beams of light from the image source module,
subject the beams to a beam splitter,
alter the beams subjected to the beam splitter to produce substantially collimated beams,
subject the altered beams to the beam splitter, and
correct the altered beams subjected to the beam splitter; and
a combiner arm assembly having at least one combiner, wherein such assembly is configured to
receive the corrected beams, and
display an image formed by the corrected beams.

2. The system of claim 1, wherein
the beams of light are received from the image source module are polarized,
the beam splitter comprises a polarizing beam splitter, and
the altering of beams subjected to the beam splitter includes producing re-polarized beams.

3. The system of claim 2, wherein the polarized beams received from the image source module comprise s-polarized beams and the re-polarization of such beams results in p-polarized beams.

4. The system of claim 2, wherein the polarized beams received from the image source module comprise p-polarized beams and the re-polarization of such beams results in s-polarized beams.

5. The system of claim 1, wherein the correcting of the altered beams produces collimated beams.

6. A method for producing an image for a catadioptric head-up display, wherein such method comprises:
   receiving beams of light,
   subjecting the beams to a beam splitter,
   altering the beams subjected to the beam splitter to produce substantially collimated beams,
   subjecting the altered beams to the beam splitter,
   correcting the altered beams subjected to the beam splitter, and
   displaying an image formed by the corrected beams.

7. The method of claim 6, wherein
   the beams of light are received are polarized,
   the beam splitter comprises a polarizing beam splitter, and
   the altering of the beams includes producing re-polarized beams.

8. The method of claim 7, wherein the polarized beams received from the image source module comprise s-polarized beams and the re-polarization of such beams results in p-polarized beams.

9. The method of claim 7, wherein the polarized beams received from the image source module comprise p-polarized beams and the re-polarization of such beams results in s-polarized beams.

10. The method of claim 6, wherein the correcting of the altered beams produces collimated beams.

* * * * *